H. ALSTERBERG.
COMBINED SELF CLEANING FILTER AND FAUCET.
APPLICATION FILED APR. 7, 1913.
1,081,563.
Patented Dec. 16, 1913.
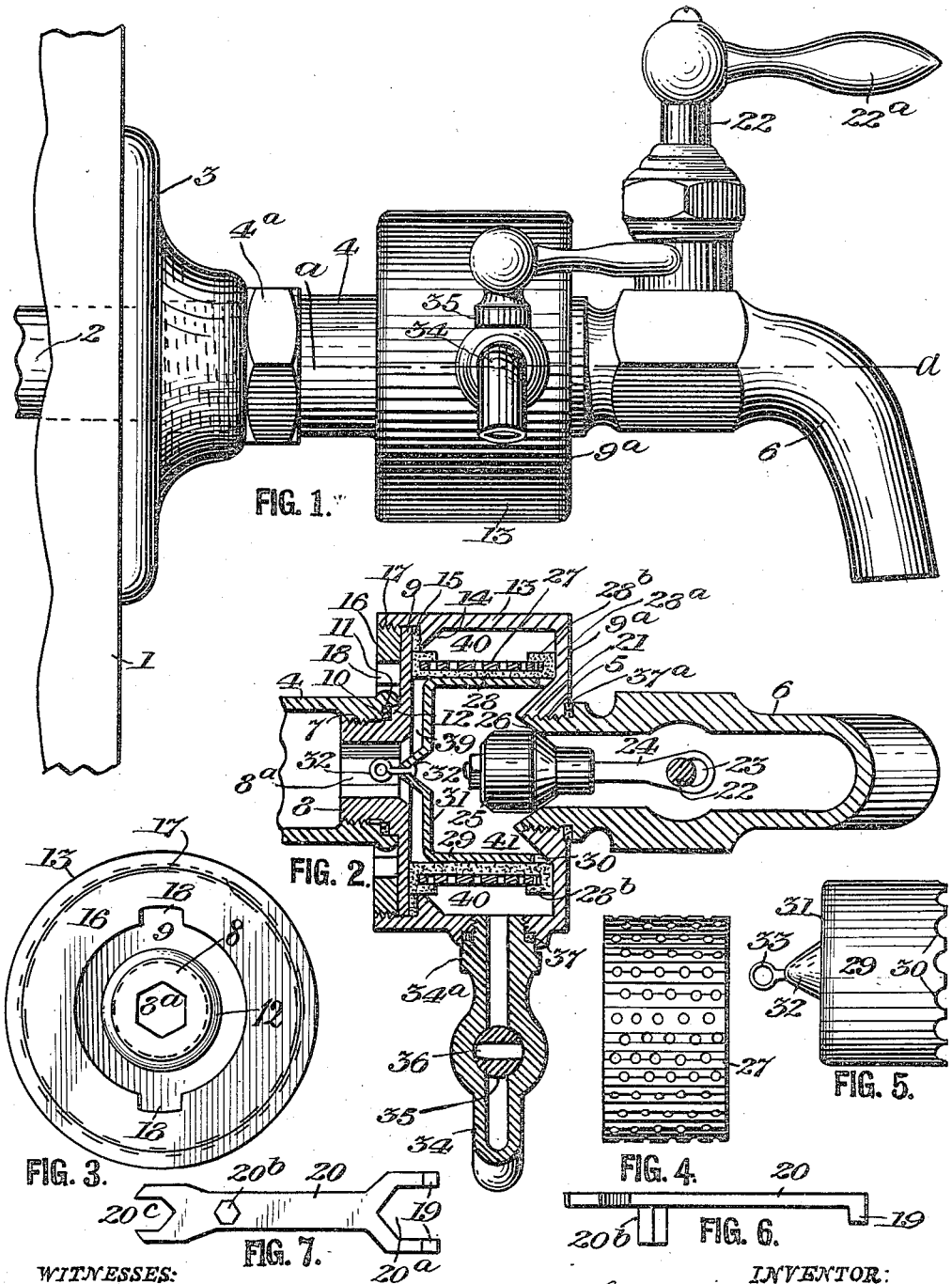

UNITED STATES PATENT OFFICE.

HENNING ALSTERBERG, OF ST. PAUL, MINNESOTA.

COMBINED SELF-CLEANING FILTER AND FAUCET.

1,081,563. Specification of Letters Patent. Patented Dec. 16, 1913.

Application filed April 7, 1913. Serial No. 759,553.

*To all whom it may concern:*

Be it known that I, HENNING ALSTERBERG, a citizen of the United States, residing at St. Paul, in the county of Ramsey and State of Minnesota, have invented a new and useful Combined Self-Cleaning Filter and Faucet, of which the following is a specification.

My invention relates to improvements in water filters and faucets, and the object is to provide a combined filter and two faucets so arranged that filtered water may be drawn from the one faucet and unfiltered water from the other faucet, and when the latter faucet is opened the water passing through it will clean the filtering device. This and other objects I attain by the construction and combination of parts illustrated in the accompanying drawing, in which—

Figure 1 is a side view of my combined filter and faucet, shown as connected by a nipple with the ordinary wall plate over a sink or basin where a water supply pipe enters. Fig. 2 is a section on the line $a$—$a$ Fig. 1. Fig. 3 is a rear end view of the filter detached from the nipple. Fig. 4 is a detail side view of the perforated tube 27 shown in Fig. 2. Fig. 5 is a side view of the filter support 29 shown in Fig. 2. Fig. 6 is an edge view and Fig. 7 is a face view on a reduced scale of a wrench used in assembling and separating the parts of the device.

Referring to the drawing by reference numerals, 1 designates the wall of a building through which a water pipe 2 enters and is either connected with or extending into or through an ornamental washer plate 3. In order to facilitate the connection of my filter and faucet to said water fixture I preferably provide a nipple or coupling, or union, as it may be called. Said nipple 4 is adapted to be screwed into the water fixture at the very place where the regular screw threaded portion 5 (see Fig. 2) of an ordinary faucet 6 is usually inserted. The front end of the nipple 4 is threaded at 7 upon a central hollow hub 8 of a disk 9, and has a recess 10 in which a packing ring 11 is held against a collar of the disk.

The main shell of the filter is a cylindrical body 13 having near its rear end an internal annular rib 14, which supports a soft packing ring 15, and against said packing ring the disk 9 is clamped by a nut washer 16 having left hand screw threads 17 in the rear end of the shell 13, and is provided with internal notches 18 for the teeth 19 of the wrench 20 in Fig. 7 to take hold of in tightening the washer by turning it. The front end of the shell 13 is provided with a central hollow inward hub 21, in which the faucet 6 is threaded. The faucet may be of any type desired, but in the present illustration is shown the type known as the " Fuller faucet ", having its handle stem 22 provided with a crank 23 operating a rod 24, by which a rubber lined plug 25 is held against or away from the flaring rear end 26 of the faucet, so as to either close or open the faucet by swinging of its handle 22$^a$.

Inserted in the shell 13 is a perforated cylinder 27 (best shown in Fig. 4) in which is inserted a filtering tube 28 made of felt or similar filtering material, and having its ends spread outward at 28$^a$ over the ends of the perforated tube 27 and closed about the ends of said tube, as clearly shown at 28$^b$. The parts 28$^a$ of the filtering tube are thus clamped between the ends of the perforated metal tube and the disk or rear bottom 9 and the front bottom 9$^a$ of the shell 13.

Within the filtering tube 28 is snugly but not very tightly fitted a cylinder 29 (best shown in Fig. 5) having its front end provided with notches 30, and its rear end closed by a bottom 31, having a central hollow rearward projection 32 provided with a finger catch 33.

In one side of the shell 13 is inserted a small faucet 34, which may be of any desired type but I have shown one of the class having a tapered valve plug 35 with a transverse water passage 36 through it, and I have shown said passage 36 to be smaller at the end where the water enters than at the end it leaves; this is to reduce the pressure of the water outside the plug so it will not rebound out of the vessel into which it is run from the faucet.

37 is a soft packing ring concealed in a recess of the casing to enable the faucet 34 to be turned with its valve stem upward. A similar packing ring 37$^a$ is for the same purpose arranged about the rear end of the faucet 6.

In the assembling of the parts of the device the large end 20$^a$ of the wrench 20 is placed on the nut portion 4$^a$ of the nipple and the latter turned until it is secured, the nut washer 16 is then placed upon the nipple, the part 20$^b$ of the wrench is then placed in the hexagon hole 8$^a$ of the hub 8 of disk 9 and the latter turned by the wrench until its hub is screwed tightly into the front end of the nipple. The parts 15, 27, 28, 29 are then put in place in the shell 13, the disk 9 placed in position and the nut washer 16 screwed home by the lugs 19 of the wrench. The object of using left handed thread on the nut-washer 16 is to prevent unscrewing of either end of the nipple by tightening the nut washer. In securing the small faucet in its place the end 20° of the wrench is placed upon the hexagon portion 34ª of the faucet.

The finger hold 33 is to enable the filter support 29 to be inserted and extracted as may be required; and the cone 32, to which it is secured, serves as a spreader of the water into the space 39 between the bottom 31 and the disk or rear bottom 9, while the inner cavity of the cone serves as a clearing for the rear end of the valve rod 24.

In the operation or use of the device, when the small valve or faucet is opened, the water, being under pressure, enters into the space 39 (in Fig. 2) and is forced in between the cylinder or spreader 29 and the filtering device 27, and through the latter and through the perforations of the filter frame 27, whereby it is filtered into the space 40 and passes from there out through the said small faucet. Such filtered water is used for drinking water and for other purposes where strictly pure water is desired, but if large quantities of water is required for cooking, clothes-washing or other purposes, the large faucet 6 is opened and the water will then pass from the space 39 and between the filter and its inner frame 29, and through the notches 30 it reaches the space 41 within the frame 29 and escapes between the plug 25 and flared portion 26 of the faucet. While the water thus rushes along the inner face of the filtering device 28 and partly through the body thereof, it removes all impurities which may have been deposited by the water passed through the filter when the small faucet is opened.

What I claim is;—

1. In combination, a filtering device for water or other liquids, the same comprising a hollow body having an inlet and two outlets, the latter provided each with a faucet, a filtering means held within the hollow body, means for directing the water through the filtering means when passing to one of the faucets, and means normally in contact with the filtering means for directing the water into a cleansing contact with and partly through the filtering means when passing to the other faucet.

2. The combination with a supply pipe for water or other fluid, of a faucet for drawing water from the pipe, a filter adapted to be inserted between the pipe and the faucet, a second faucet on the filter, a filtering element in the filter, said filter having a passage leading the water through the filtering element to the second faucet, and a passage directing the water, a solid element in the latter passage and normally contacting with the filtering element, so that the water must force its way between the two elements and partly through the filtering element and thereby cleanse the latter to the main faucet.

3. In combination, a cylindrical shell having one fixed bottom and one removable bottom, a faucet secured in one side of the shell, a faucet secured in the center of one of the bottoms, centrally located means in the other bottom for readily connecting the bottom with a supply pipe, said bottom having a central opening, means for securing said bottom firmly to the shell; a perforated metal tube placed concentrically in the shell, a cylindrical tubular filtering element fitting in the perforated tube and having its ends spread outward and held between the ends of the perforated tube and the bottoms of the shell, a water spreading device of cylindrical form loosely fitted within the filtering tube and extending almost the entire length thereof, said spreading tube having one end closed by a bottom bulged outward in the middle so as to spread the water coming from the supply pipe, and the other end open and provided with notches for the water to pass through to the central faucet, and means on the bottom of the spreading device for taking hold of in extracting it from the filtering element.

In testimony whereof I affix my signature, in presence of two witnesses.

HENNING ALSTERBERG.

Witnesses:
B. M. JOISTAD,
ROBERT C. F. SCHMIDT.

---

Copies of this patent may be obtained for five cents each, by addressing the "Commissioner of Patents, Washington, D. C."